UNITED STATES PATENT OFFICE.

BENJAMIN HALL, OF NEVADA CITY, CALIFORNIA.

PROCESS OF EXTRACTING GOLD AND SILVER FROM ORES.

No. 868,551.  Specification of Letters Patent.  Patented Oct. 15, 1907.

Application filed March 22, 1907. Serial No. 363,834.

*To all whom it may concern:*

Be it known that I, BENJAMIN HALL, a citizen of the United States, residing at Nevada City, in the county of Nevada and State of California, have invented new and useful Improvements in Process for the Extraction of Gold and Silver from Ores, of which the following is a specification.

My invention relates to an improved process for the extraction of gold and silver from their ores by the use of cyanid of potassium.

It consists in a means for forming the pulverized ore into a porous cyanid-containing mass through which air may automatically circulate to produce the required reduction.

It is well known that in any cyanid processes for the extraction of gold and silver, oxygen is necessary to produce the required separation, and this in the case of liquid solutions, must be introduced in various mechanical ways.

It is the object of my invention to provide for the automatic introduction and circulation of oxygen through a mass of ore until the required reduction has taken place.

In carrying out my process, the crushed ores or concentrates are first mixed with a cyanid solution of the necessary strength to dissolve the precious metals contained in the material under treatment, until all the gold and silver soluble are in solution, which will depend upon the character of the material and the fineness of the metals.

The solution is mixed in the proper quantity with the mass of material to reduce the mass to a loose moist condition which is obtained by taking the dry material, moistening it with from 10 to 20 per cent of cyanid solution, this depending on the fineness of the material; or by leaching the material, then using a suction to remove excess solution and obtain sufficient dryness. The mass of material is afterwards loosened up by hand, or other suitable means or mechanical contrivance until it is in such a porous condition that air will circulate through the mass.

The action which takes place will cause the metals to dissolve, and the usual chemical changes to take place, the time varying from one to ten days, after which a simple leaching with water may take place, and this is all that is necessary to remove the dissolved metals which are then recovered in the usual manner by the use of zinc in the form of shavings, dust, or other suitable form.

It will be understood that if the material to be operated upon, already contains moisture, it will only be necessary to introduce a sufficiently strong solution, to bring the contained moisture up to the required strength, still leaving it in a loose condition, and not containing an excess of solution.

Having thus described my invention, what I claim and desire to secure by Letters Patent is—

1. The process of recovering gold and silver from their ores, said process consisting in mixing the ore. with a cyanid solution, then loosening up the mass and admitting air thereto.
2. The process of recovering gold and silver from their ores, consisting in pulverizing the ore, mixing a cyanid solution therewith, subjecting the mass to a suction or vacuum to remove excess of the solution, and loosening the mass to allow air to permeate there-through.

3. The process of recovering gold and silver from their ores, consisting in pulverizing the ore, mixing a cyanid solution therewith, subjecting the mass to a suction or vacuum to remove excess of the solution, loosening the mass to allow air to permeate there-through, and finally leaching the mass and subjecting the dissolved metals to the action of metallic zinc.

4. The process of recovering gold and silver from their ores, said process consisting in mixing the pulverized ore with a cyanid solution, then expelling the excess of solution to form a moist pulverulent mass, loosening said mass, and exposing it to the circulation of air there-through.

In testimony whereof I have hereunto set my hand in presence of two subscribing witnesses.

BENJAMIN HALL.

Witnesses:
 CHARLES E. ASHBURN,
 FRED SEARLS.